United States Patent [19]

Tada et al.

[11] Patent Number: 4,893,177
[45] Date of Patent: Jan. 9, 1990

[54] APPARATUS AND A METHOD FOR GENERATING MANUSCRIPTS TO REPRODUCE A COLOR PRINT

[75] Inventors: Kaoru Tada; Masaaki Oyabu, both of Aichi, Japan

[73] Assignee: Minolta Camera Kabushiki Kaisha, Osaka, Japan

[21] Appl. No.: 937,510

[22] Filed: Dec. 3, 1986

[30] Foreign Application Priority Data

Dec. 5, 1985 [JP] Japan .................................. 60-273772

[51] Int. Cl.⁴ ............................................ H04N 1/387
[52] U.S. Cl. ........................................... 358/75; 358/80
[58] Field of Search ................. 358/80, 75, 78, 75 IJ

[56] References Cited

U.S. PATENT DOCUMENTS

| | | | |
|---|---|---|---|
| 3,153,698 | 10/1964 | Hall et al. | 358/80 |
| 3,194,882 | 7/1965 | Hall | 358/80 |
| 3,194,883 | 7/1965 | Ross | 358/80 |
| 4,584,601 | 4/1986 | Suzuki et al. | 358/75 X |
| 4,595,948 | 6/1986 | Itoh et al. | 358/75 |
| 4,614,967 | 9/1986 | Sayanagi | 358/75 |
| 4,635,078 | 1/1987 | Sakurada et al. | 358/75 X |
| 4,636,844 | 1/1987 | Sasaki | 358/80 |
| 4,668,978 | 5/1987 | Gokita | 358/75 X |
| 4,672,432 | 6/1987 | Sakurada et al. | 358/75 IJ |
| 4,680,625 | 7/1987 | Shoji et al. | 358/80 |
| 4,682,186 | 7/1987 | Sasaki et al. | 358/75 X |
| 4,686,538 | 8/1987 | Kouzato | 358/75 IJ |

FOREIGN PATENT DOCUMENTS 3519007 12/1985 Fed. Rep. of Germany ........ 358/75

Primary Examiner—James J. Groody
Assistant Examiner—Mark R. Powell
Attorney, Agent, or Firm—Burns, Doane, Swecker & Mathis

[57] ABSTRACT

According to the present invention, there are provided an apparatus and a method in which a full-color, original manuscript is optically scanned, the optical image is separated into three pirmary colors and the resultant image data is read, and then the image data thus read is outputted to a thermal printer, thereby generating a print for each color undergone the color separation. Namely, the manuscripts for effecting a printing operation with yellow, magenta, cyan, and black are created by use of an ink sheet.

In other words, a correction is achieved to set the total of the areal ratios of yellow, magenta, cyan, and black in each pixel of the reproduced image to at most 100% (or the total of the numbers of dots for yellow, magenta, cyan, and black is set to be equal to at most the number of matrix elements), thereby achieving the object described above.

27 Claims, 9 Drawing Sheets

FIG.7 (A)

| 1 | 9 | 3 | 11 |
|---|---|---|---|
| 13 | 5 | 15 | 7 |
| 4 | 12 | 2 | 10 |
| 16 | 8 | 14 | 6 |

FIG.7 (B)

| Y | B$_K$ | Y | |
| | M | | M |
| Y | | Y | B$_K$ |
| | B$_K$ | | M |

APPARATUS AND A METHOD FOR GENERATING MANUSCRIPTS TO REPRODUCE A COLOR PRINT

BACKGROUND OF THE INVENTION

1. Field of the Invention

The present invention relates to an apparatus and a method for generating manuscripts to reproduce a color print, and in particular, to an apparatus and a method for generating by use of a thermal ink sheet four sheets of manuscripts for the toners of complementary colors of three primary colors (i.e. three primary colors of the subtractive mixture of color stimuli) and for the toner of black.

The manuscripts to reproduce the color print generated according to the present invention can be used, for example, in a commonly-used monochrome copying machine to obtain a color copy in which a set of a manuscript and a developing unit having a toner of a color that to the color of the manuscript is sequentially changed so that a toner of a different color is sequentially applied onto the same copy sheet.

2. Description of the Prior Art

Conventionally, the light reflected from a color, original image (an original manuscript) is separated into three primary colors (reference stimuli: blue, green, and red, in general), the sheets of manuscript for printing the separated image in the complementary colors of the three primary colors (the three primary colors of the subtractive mixture of color stimuli: yellow, magenta, and cyan, in general) and a sheet of manuscript for the black printing when required are generated according to the respective separated colors (i.e. images of separated colors), and by using the three or four kinds of manuscripts thus generated, the toner of yellow, magenta, cyan, and black, if required, is sequentially changed to be applied onto the same copy sheet, thereby reproducing the color print.

Incidentally, in each manuscript described above (for the printing of the separated image with the yellow, magenta, cyan, or black toner), the half tone may be represented according to the so-called area gradation method in which the area ratios (or the numbers of dots) are defined for each pixel. The area gradation method is also called a dot density modulating method in which a pixel is further divided into subordinate matrices so that the gradation of a pixel corresponds to the number of dots allocated to each element of the matrices.

For generating the manuscript in general, the so-called thermal copy method for copying the ink from an ink sheet onto a copy sheet is adopted.

In the conventional method described above, however, a plurality of ink sheets are required to generate a set of the manuscripts for the yellow, magenta, cyan, and black printing. This is because the same element of the matrices in the ink sheet can be used only once due to the characteristic of the ink sheet.

Consequently, if the total of area ratios of yellow, magenta, cyan, and black areas exceed 100% for a pixel (or the total dot count of the yellow, magenta, cyan, and black dots exceeds the maximum allowable dot count for the pixel (number of matrix elements)) and hence a color overlap such as between yellow and magenta, magenta and cyan, or cyan and yellow takes place in a region (matrix element) in the pixel, the next copy (generation of the manuscript) cannot be accomplished by use of the same ink sheet in the region where the overlap takes place, and hence the ink sheet must be changed. Such an overlap condition occurs quite frequently.

SUMMARY OF THE INVENTION

It is therefore an object of the present invention to provide an apparatus and a method which are capable of generating manuscripts for the yellow, magenta, cyan, and black printing by use of an ink sheet, thereby removing the problems of the prior art technique.

That is, according to the present invention, the total of the area ratios of the yellow, magenta, cyan, and black areas in each pixel (picture element) of a print to be reproduced is set to be equal to or less than 100% (or the total dot count of the yellow, magenta, cyan, and black dots is set to be equal to or less than the number of each matrix elements) so as to achieve the object described above.

FIG. 1 is a schematic block diagram illustrating the concept of the present invention.

The apparatus of the present invention optically scans a full-color original manuscript 1 to separate the optical image thereof into three primary colors and outputs the image data thus read to a thermal printer 5, so that a printing is effected for each color obtained through the color separation. This apparatus is characterized as follows.

The apparatus comprises means for optically scanning the original manuscript 1, a spectroscope 21 for effecting a color separation on an optical image reflected from the manuscript 1 thus optically scanned, photoelectric transducers 22, 23, and 24 for effecting an photoelectric transducing operation on the separated three primary colors, means 3 for generating an electric signal corresponding to a density level of each pixel in each image associated with the separated light, and means 4 for conducting an operation processing on the electric signal to generate a binary image data to be outputted to a thermal printer 5, said means 4 processing the electric signal according to an area gradation method so that a total of dots of each color in each pixel is equal to or less than a total of matrix elements in the pixel to arrange the dots for preventing the dots of each color from overlapping with each other in the matrix elements and said binary image data being outputted to the thermal printer 5 for each color.

The method according to the present invention that generates manuscripts of each color image separated from the original manuscript 1 is characterized as follows.

The method includes a step for generating an electric signal corresponding to a density of each image obtained by separating light reflected from original manuscript 1 into three primary colors through an optical scanning, a step for determining a number of dots in each pixel of each color by processing the electric signal so that a total of dots of each color for the pixel is equal to or less than a total of matrix elements in an area gradation method, a step for arranging the dots of which the number is thus determined on the matrix elements so as to prevent an overlapping condition from occurring between the dots of each color, and a step for separately outputting an image data of each color to a thermal printer 5.

The provision described above enables the generation of a manuscript for each color.

According to the present invention, since the total of the corrected area ratios is at most 100% in any pixel, the reproduction dots for cyan, magenta, yellow, and black do not overlap with each other. Consequently, four manuscripts can be created from an ink sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 7A is an explanatory diagram illustrating an example of a method for specifying areas in a pixel;

FIG. 7B is also an explanatory diagram illustrating an example of a method for specifying areas in a pixel;

DETAILED DESCRIPTION OF THE INVENTION

Figure 1:
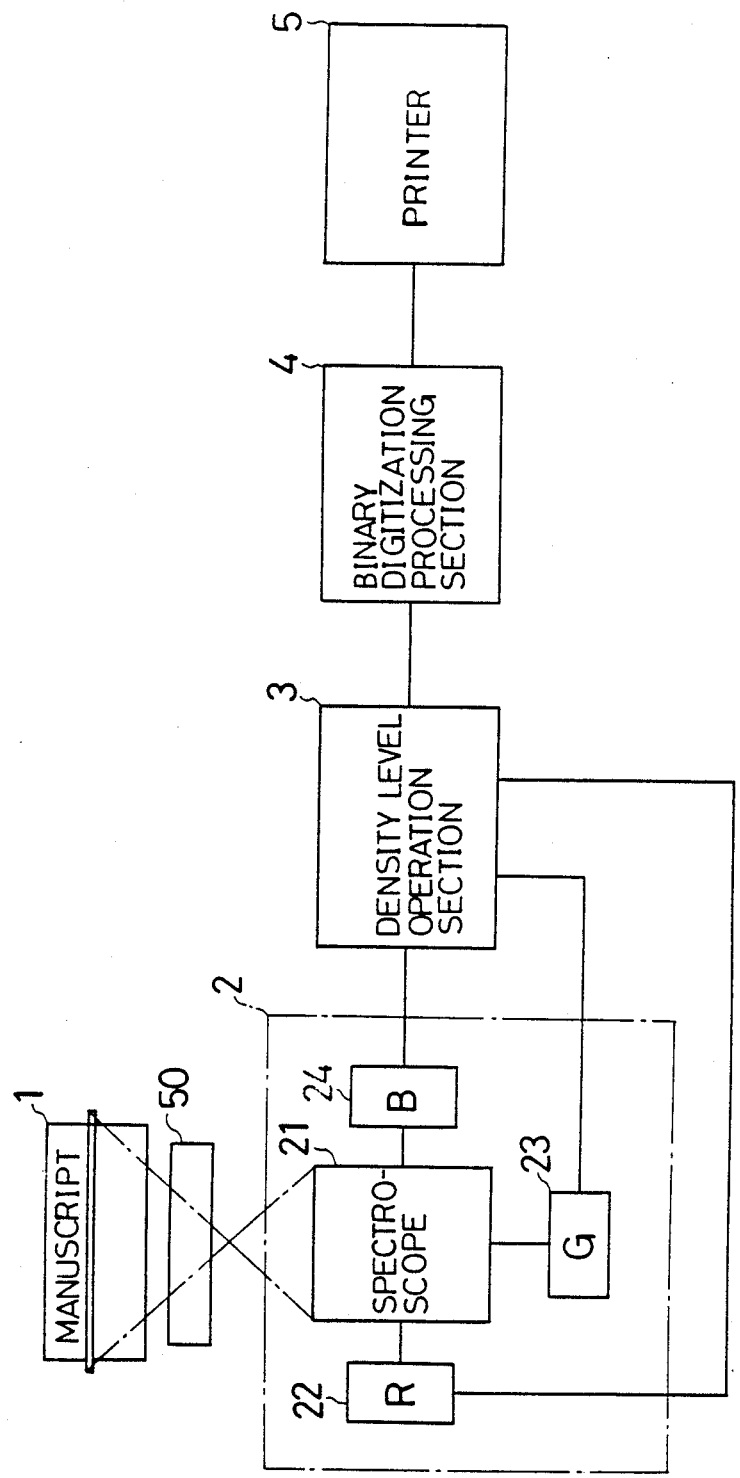
FIG. 1 is a schematic block diagram showing the concept of the present invention.

First, the components of the present invention will be described.

As a spectroscope 21 for separating the light reflected from the original manuscript 1 through an optical scanning into three primary colors (blue, green, and red), a dichroic filter can be used.

As the photoelectric transducers 22, 23, and 24 for receiving the image of each separated light and effecting photoelectric transducing operation thereon, a CCD (Charge Coupled Device) imaging device can be disposed for each separated color for the reception thereof.

The spectroscope 21 and the photoelectric transducers 22, 23, and 24 constitute a photoelectric transducing section 2. In the photoelectric transducing section 2, the intensity of each separated light may be regulated by use of a device such as a filter. Moreover, the photoelectric transducing section 2 achieves the A/D conversion and a conversion of blue, green, and red into cyan, magenta, and yellow, respectively in general.

Density level operation section 3 receives signals from the photoelectric transducers 22, 23, and 24, executes processing such as a shading correction, a γ correction, and a mask processing so as to correct the unevenness of illumination intensity and correspondence of density between the original image and the reproduced image, and calculates the density level of each pixel for the reproduced colors with consideration to the overlapping condition of the wavelength ranges between the reproduced colors (yellow, magenta, and cyan). Moreover, when required, the density level operation section 3 performs, based on the density levels thus calculated, a UCR (undercolor removal) processing in which the overlapped portions of the density levels associated with yellow, magenta, and cyan are replaced with the density level of black. As well known, the color representation by use of the subtractive mixture of colors is generally conducted by adjusting the respective density levels at the mixture of the yellow, magenta, and cyan which are the three primary colors in the subtractive mixture of colors; moreover, since the mixture portion having the same level between the yellow, magenta, and cyan is perceived as black, the portion is replaced with black. This correction is called the UCR (undercolor removal) processing.

A binary digitization processing section 4 operates to calculate from the density level of each color after the UCR the area ratios of yellow, magenta, cyan, and black for each pixel. Namely, the density level of each color for the pixels associated with the original image is replaced with the corresponding area ratio so as to represent the gradation of the reproduced image based on the ratios of the areas occupied by the colors in the pixel, which is referred to as the area gradation method. Here, "the area ratio in the pixel" will be explained as follows, for example, on yellow.

$$\text{Yellow area ratio} = \text{(yellow area in a pixel/area of the pixel)} \times 100 \quad (1)$$

Consequently, if the saturated state of each density level of yellow, magenta, and cyan is assumed to be expressed as 100%, the area ratio and the density level of each color in each pixel take always the same values, respectively. In other words, $$\text{area ratio} = \text{Density level} \quad (2)$$

results, which facilitates the understanding of the condition.

The area ratios are corrected so that the maximum value of the total of the area ratios of yellow, magenta, cyan, and black is at most 100%. (The area ratios before the correction and after the corrections are referred to as the original and corrected area ratios herebelow.) In the foregoing description, "the maximum of the total is at most 100%" means that the sum of the area ratios (corrected area ratios) of yellow, magenta, cyan, and black does not exceed 100% in any pixel. To this end, for example, the area ratios (corrected area ratios) may be calculated in the ordinary method applied to each density level having undergone the UCR and multiplied by ½, or contrarily, the area ratios (corrected area ratios) may be obtained by multiplying by ½ the area ratios (original area ratios) in the ordinary method based on each density level after the UCR.

Figure 2:
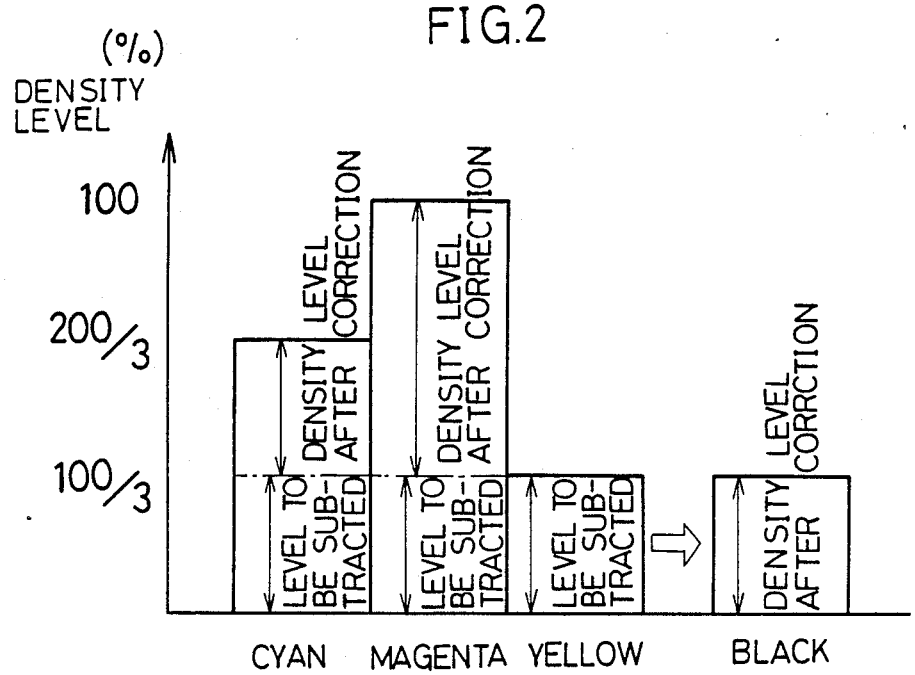
FIG. 2 is a schematic diagram for explaining the reasons why the gradation or thickness level or the area ratio is multiplied by ½ in the correction to set maximum value of the total of area ratios to be 100%.
Figure 3:
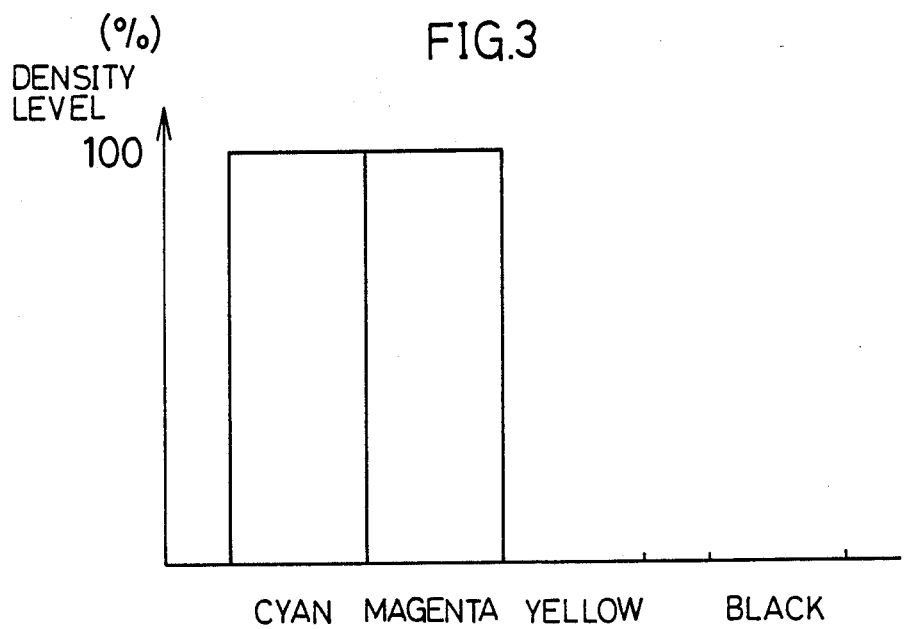
FIG. 3 is also a schematic diagram for explaining the reasons why the gradation or thickness level or the set maximum value of the total of area ratios is to be 100%.

FIGS. 2 and 3 are schematic diagrams for explaining the reasons why the density level or the area ratio (original area ratio) is multiplied by ½ in the correction to set the maximum value of the total of the area ratios to 100%.

As described above, the color representation in the subtractive mixture of colors is achieved by adjusting the density levels in the color mixture between yellow, magenta, and cyan which are the three primary colors in the subtractive mixture of colors. Moreover, the color mixture portions having the same density level between yellow, magenta, and cyan are replaced with black. Consequently, for example, as shown in FIG. 2, if the density level in a pixel is 200/3% for cyan, 100% for magenta, and 100/3% for yellow, the common level of the three primary colors, namely, 100/3% is replaced with the density level of black, and the actual density levels of cyan, magenta, and yellow are set as the values obtained by subtracting the black density level 100/3% from the original density levels of cyan, magenta, and yellow.

For a pixel, the possible maximum value of the total of the density levels of cyan, magenta, and yellow is 200% as shown in FIG. 3. Namely, since the overlapped portions between cyan, magenta, and yellow are replaced with black as described above, each of colors at the combination of cyan and magenta (magenta and yellow, or yellow and cyan) takes 100%, and hence the total becomes 200% for a pixel. Consequently, to prevent the total of the corrected area ratios from exceeding 100% for any pixel, the original area ratio or the density level need only be multiplied by ½ as described above. As can be seen from the foregoing description, the area ratio in the expression (2) means the original area ratio.

The density level operation section 3 and the binary digitization processing section 4 can be configured by a software manner in microcomputer.

The thermal printer 5 can be implemented by a commonly used conventional printing unit. Since the overlapping of the colors is prevented in each matrix element at the image reproduction, only one ink sheet suffices for an original manuscript. The thermal printer 5 represents the half tone in the area gradation method based on the given area ratios.

The present invention operates as follows.

The light reflected from the color, original manuscript 1 is split into three primary colors (blue, green, and red) in the spectroscope 21 and the resultant lights are delivered to the respective photoelectric transducers 22, 23 and 24, which in turn effect the photoelectric conversion to generate the electric signals corresponding to the patterns of the images associated with the separated lights (the image generated in association with an reference stimuli of blue, green or red).

The electric signals are processed by the density level operation section 3 and are converted into signals corresponding to the density level of each complementary color of the three primary colors (yellow, magenta, and cyan). In addition, the density level operation section 3 is also used to accomplish the processing of various kinds of corrections and the UCR processing.

The binary digitization processing section 4 converts the signal associated with a density level into an area ratio. In this operation, correction is effected so that the total of the area ratio of each color does not exceed 100% for any pixel. The corrected area ratio can be, for example, represented by use of the number of dots per pixel. Namely, if the number of matrix elements of a pixel is 16 and the corrected area ratio is 50%, the number of dots is set to eight. The corrected area ratio thus obtained specifies matrix elements so as not to cause an overlapping condition between the colors and is outputted as a binary signal. To specify the matrix elements, the prior art method can be utilized.

The thermal printer 5 sequentially prints the manuscripts for yellow, magenta, cyan, and black according to the binary signal in the thermal transcribing method. In this printing operation, the dots associated with yellow, magenta, cyan, and black do not overlap with each other in any matrix element of the pixels. Consequently, using an ink sheet, the manuscripts for yellow, magenta, cyan, and black can be printed.

Having generally described this invention, a further understanding can be obtained by reference to certain specific examples which are provided herein for purposes of illustration only and are not intended to be limiting unless otherwise specified.

The present invention will be described herebelow based on concrete embodiments.

Figure 4:
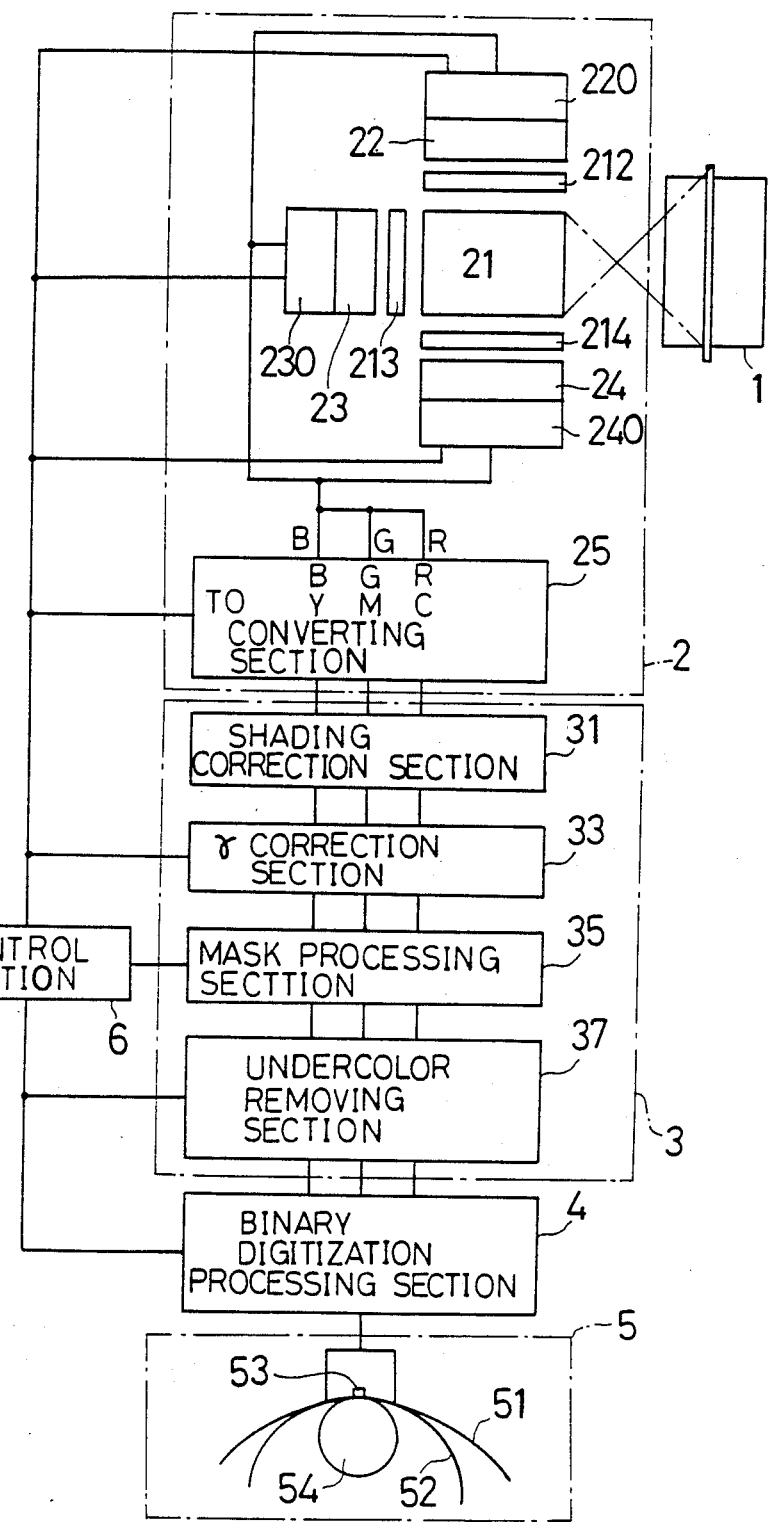
FIG. 4 is a block diagram depicting a simplified configuration of an embodiment of the present invention.
Figure 5:
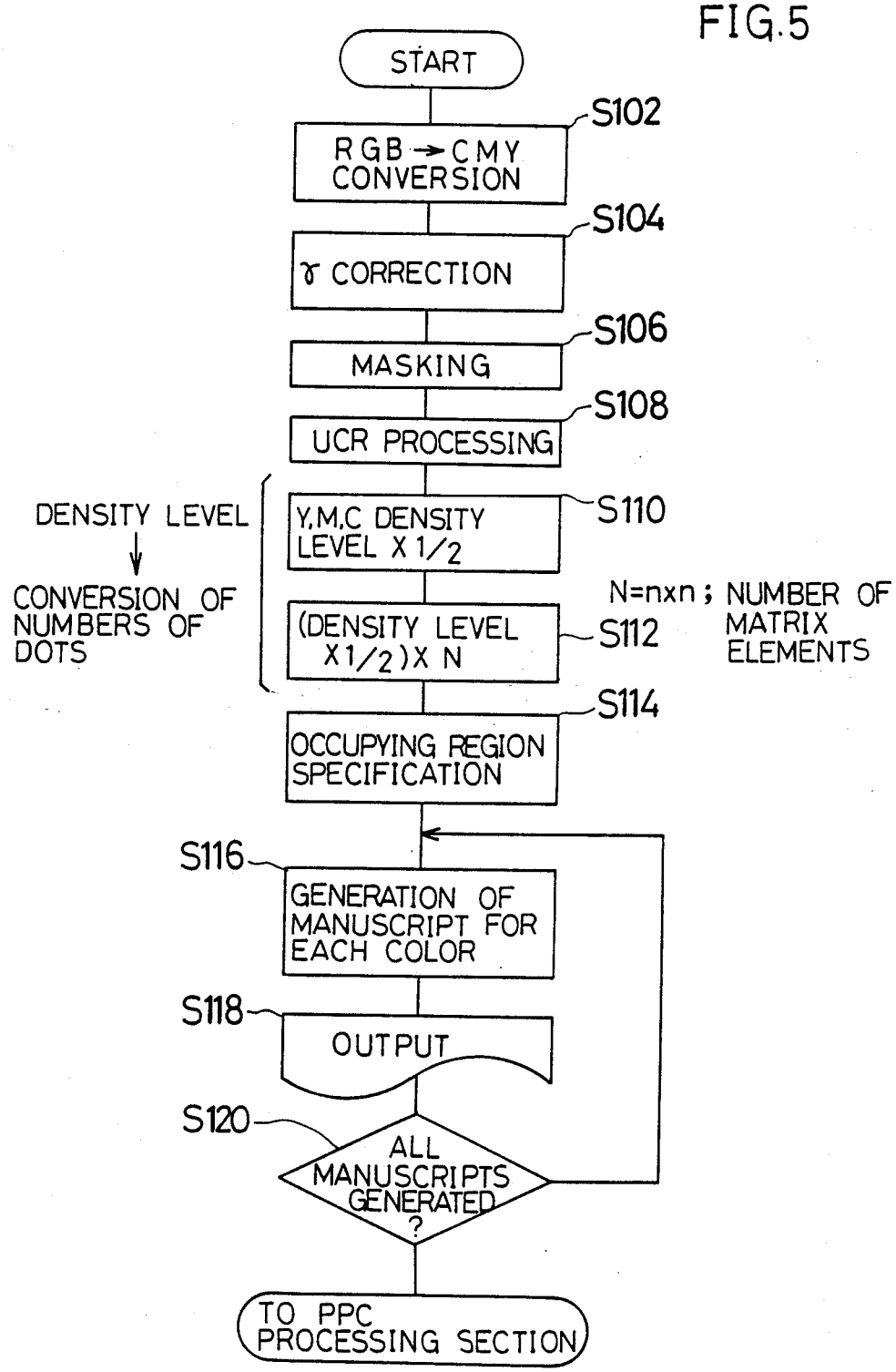
FIG. 5 is a flowchart illustrating an outline of the processing in the apparatus of the present invention.

FIG. 4 is a block diagram showing a simplified configuration of an apparatus as an embodiment of the present invention. FIG. 5 is a flowchart illustrating an outline of the processing conducted in the aparatus.

Figure 6:
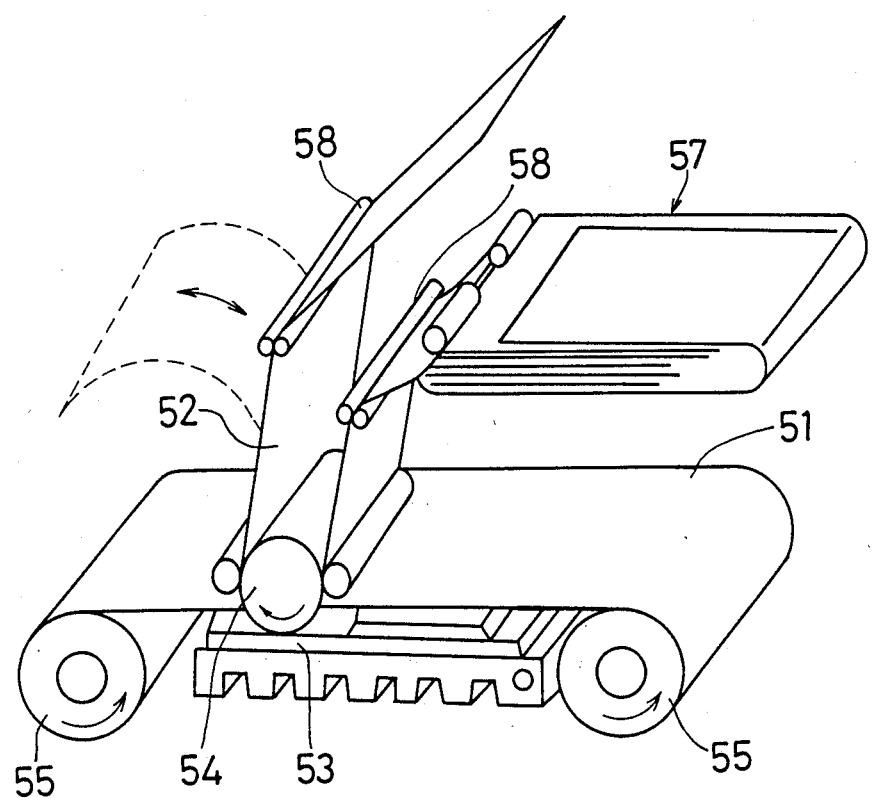
FIG. 6 is a perspective view showing a thermal printer adopted in the apparatus of the present invention.

FIG. 6 is a perspective view depicting the thermal printer used in the embodiment.

As shown in the drawings, the apparatus of the embodiment comprises a photoelectric transducing section 2 for effecting an optical scanning on an original manuscript 1, a density level operating section (31, 33, 35, 37) for effecting an operation to calculate a density level from an electric signal transmitted from the photoelectric transducing section 2, a binary digitization processing section 4 for calculating an area ratio from the signal fed from said density level operating section 3 and for outputting the area ratio as a binary signal by specifying a reproduction dot in a pixel for each color so as not to cause an overlapping condition. Thermal printer 5 receives the binary signal and sequentially prints the reproduction images associated with the complementary colors and black according to the thermal copying method. A control section 6 sequentially controls these operations.

The photoelectric transducing section 2 includes a scanning section 50 having a light source, a reflection mirror, and a lens system, a dichroic filter 21 including a spectroscopic device, a blue (B) filter 214, a green (G) filter 213, and a red (R) filter 212 for correcting the intensity and the spectroscopic characteristic of each separated light, a CCD 24 for blue, a CCD 23 for green, a CCD 22 for red for receiving the separated lights thus corrected and for effecting a photoelectric conversion thereon, CCD drivers 240, 230, and 220 for driving these CCD's 24, 23, and 22, and a signal conversion section 25 for converting the blue (B), green (G), and red (R) signals into yellow (Y), magenta (M), and cyan (C) signals.

The density level operation section 3 comprises a shading correction section 31 for calibrating the unevenness of the light intensity caused due to, for example, a distortion in the optical system when effecting the optical scanning on the original manuscript 1, a $\gamma$ correction section 33 for adjusting the correspondence of the gradation between the original manuscript 1 and the reproduced image, a mask processing section 35 for correcting the uncleanness or turbidity of the reproduced colors caused by an overlap between wavelength ranges of yellow (Y), magenta (M), and cyan (C), and an undercolor removing section 37 for replacing the overlapped portions of the density levels between yellow (Y), magenta (M), and cyan (C) so as to subtract the replaced portions from the density levels of yellow (Y), magenta (M), and cyan (C).

The thermal printer 5 includes a feeding roller 55 for feeding a monochrome ink sheet 51, a takeup roller 56 for winding up the ink sheet 51, a cassette 57 for containing copying papers 52, a paper feeding roller 58, a thermal line head 53 for heating any dots in response to signals from the binary digitization processing section 4 and for fusing locations of the ink sheet 51 corresponding to the heated dots, and a platen 54 for pushing the paper 52 against the thermal line head 53 so as to move the paper 52.

The apparatus of this embodiment operates as follows.

When the control section 6 detects an input from a print start key (not shown), the scanning section starts the optical scanning of the original manuscript 1 according to the signal from the control section 6. The optical scanning is accomplished three times for an original manuscript 1 (for yellow, magenta, and cyan). As will be described later, although the reflected light is separated into three primary colors and the resultant lights are respectively processed; in the first scanning, for example, the components other than yellow are used to correct yellow, the total of three optical scanning operations are required.

The light reflected from the original manuscript 1 is separated into three primary colors including blue, green, and red by the dichroic filter 21 and the obtained lights are fed via the blue filter 214, the green filter 213, and the red filter 212 to the CCD devices 24, 23, and 22, respectively, which in turn effect the photoelectric conversion thereof.

The CCD devices 24, 23, and 22 are respectively driven by the CCD drivers 240, 230, and 220, and the signals thus undergone the photoelectric conversion are subjected to the A/D conversion and the resultant signals are further converted into signals associated with yellow, magenta, and cyan in the signal conversion section 25 (S102). The signal conversion section 25 may be included in the CCD drivers 240, 230, and 220.

The yellow, magenta, and cyan signals are subjected to an adjustment of the highlight level in the shading correction section 31 and the gradation in the $\gamma$ correction means 33 (S104). Next, the unclear or turbid portions due to the overlapping between the wavelength ranges of yellow, magenta, and cyan are removed in the mask processing section 35 (S106), and then the common portions of yellow, magenta, and cyan having the same density level are replaced with black (S108).

The density level signals associated with yellow, magenta, cyan, and black are converted in the binary digitization processing section 4 into signals representing the numbers of dots in each pixel.

That is, the density level is first multiplied by ½ (S110) and the number of matrix elements/100 is multiplied by the resultant density level (S112).

For example, if the density level is 50% for yellow to be fed to the binary digitization processing section 4 and the number of matrix elements is $4 \times 4 = 16$, Number of yellow dots $= (50/2) \times (16/100) = 4$ and therefore the number of yellow dots in the pixel can be determined to be four.

Next, in S114, the regions (or dots) in the pixel are specified in which yellow, magenta, cyan, and black are located. The specification is made so that yellow, magenta, cyan, and black are not overlapped with each other.

FIGS. 7A and 7B are schematic diagrams illustrating an example of the region specifying method.

As shown in FIG. 7A, priority is assigned to the matrix elements in the pixel, and on the other hand, priority is also assigned to the reproduced colors in the sequence of yellow, magenta, cyan, and black.

If the number of yellow, magenta, and black dots are 4, 3, and 3, respectively, the dots for the corresponding colors are specified as shown in FIG. 7B and hence the overlap between colors is prevented.

Figure 9:
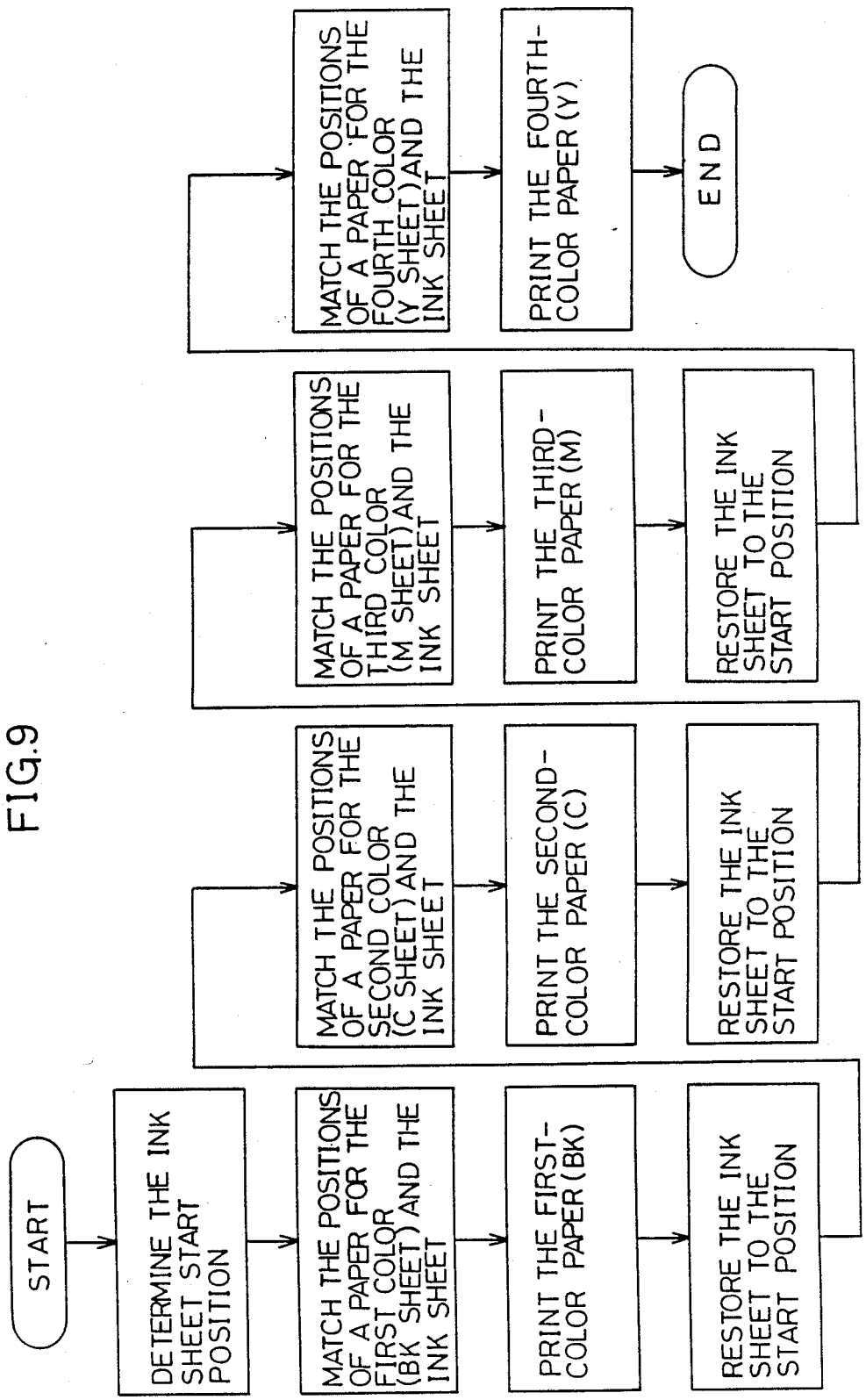
FIG. 9 is a flowchart showing an outline of the operation of the thermal printer.

As described above, the signals for which the binary state of on or off is thus specified for each matrix element of each pixel are transmitted to the thermal printing head 53 of the thermal printer 5, which then transcribes the ink of the matrix elements corresponding to the ON signal. The transcribing operation is sequentially achieved four times for the manuscripts of yellow, magenta, cyan, and black (S116–S120). Moreover, in this operation, as illustrated in the flowchart of FIG. 9, prior to the subsequent transcribing operation, a positioning must be conducted after restoring the ink sheet to the original position.

The present invention is not restricted by the embodiment, which may be changed or modified in various fashions. For example, although the scanning on the original manuscript is achieved three times in the embodiment, this scanning operation may be conducted with only one time, so that the signal from each CCP is temporarily stored in a memory device to perform data processing.

Figure 8:
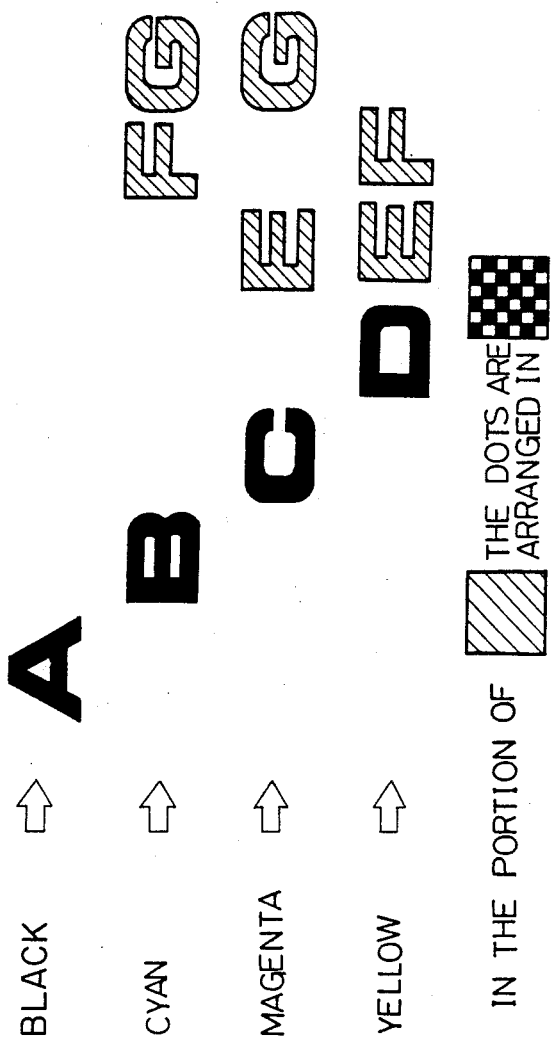
FIG. 8 is a schematic diagram depicting samples of an original manuscript and manuscript images (for black, cyan, magenta, and yellow) obtained from the original manuscript.

FIG. 8 is a schematic diagram depicting samples of an original manuscript and manuscript images (of black, cyan, magenta, and yellow) which can be generated from the original manuscript.

As shown in this diagram, when the apparatus of the present invention processes a color, original manuscript image that includes alphabetic character patterns of A (black), B (cyan), C (magenta), D (yellow), E (red), F (green), and G (blue), the character A is printed on the manuscript for black, the characters B, F, and G are printed on the manuscript for cyan, the characters C, E, and G are printed on the manuscript for magenta, and the character D, E, and F are printed on the manuscript for yellow. Moreover, for F and G of the manuscript for cyan, E and G of the manuscript for magenta, and E and F of the manuscript for yellow, the printed dot patterns are arranged in the checkerwise configuration so as to prevent the overlapping. The four sheets of manuscripts for black, cyan, magenta, and yellow can be created from an ink sheet.

Figure 10:
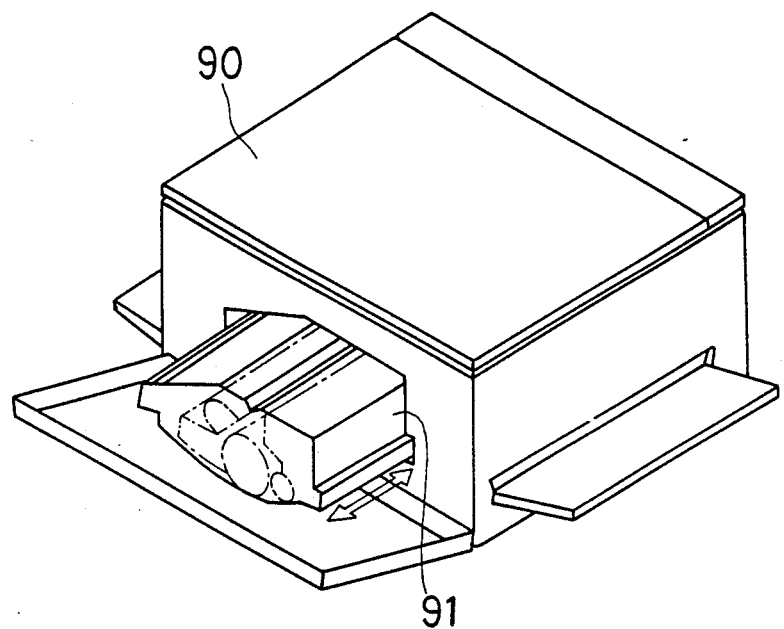
FIG. 10 is a perspective view depicting a copying machine used to obtain a color copy from the manuscripts generated by the embodiment.
Figure 11:
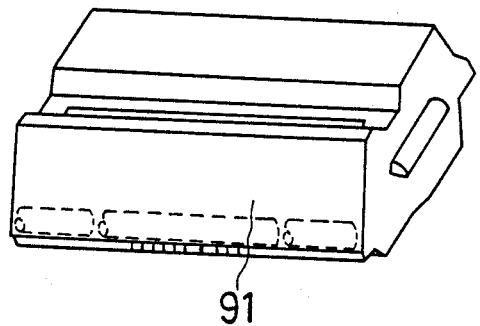
FIG. 11 is a perspective view illustrating a developer cartridge of the copying machine.

FIG. 10 is a perspective view showing a copying machine used to obtain a color copy form the manuscripts generated by the embodiment and FIG. 11 is a perspective view illustrating a developer cartridge of the copy machine.

A copy machine 90 is a monochrome copy machine, however, a developer cartridge 91 can be removably installed in the copy machine 90. There are provided four developer cartridges 91 to which the yellow, magenta, cyan, and black toner is set, respectively.

The color copy is generated as follows.

First, the manuscript for yellow is installed in the manuscript plate of the copying machine 90. And then a developer cartridge 91 containing the yellow toner is attached to the copying machine 90. After the cartridge 91 is installed, the necessary number of copies are generated.

Next, the manuscript for magenta is installed onto manuscript plate of the copying machine 90 in the same location as for the manuscript for yellow. And then a developer cartridge 91 containing the magenta toner is installed to the copying machine 90 by replacing the developer cartridge of the yellow toner, and thereafter a copying operation is effected with the magenta toner on the copying sheet onto which the yellow toner has been applied.

Next, the copying is successively accomplished with cyan and black, thereby obtaining a full-color copy.

As described above, a full-color copy can be generated by use of the four manuscripts created according to the embodiment described above.

Having now fully described the invention, it will be apparent to one of ordinarily skill in the art that many changes and modifications can be made thereto without departing from the spirit or scope of the invention as set forth herein.

What is claimed is:

1. An apparatus for effecting an optical scanning of a full color manuscript, for separating an optical image thereof into three primary color images, for reading each image, and for outputting data for each image thus read to a thermal printer so as to generate a print associated with each primary color obtained by the color separation, comprising:
   means for effecting an optical scanning of the full color manuscript;
   means including a spectroscope for effecting a color separation of an optical image obtained by optically scanning the full color manuscript;
   a plurality of photoelectric transducer means for conducting a photoelectric conversion for each color of light to generate an electric signal corresponding to a density level at each pixel of the image associated with each separated color;
   means for processing each electric signal to generate binary data for the image to be outputted to a thermal printer, said means adapted to process the electric signals according to an area gradation method that includes reducing the density level of each color at each pixel location by an amount corresponding to a density level common to each separated color and multiplying said electric signals by a factor of decimal fraction corresponding to the number of color images used so that a total of dots in a pixel associated with each color is at most a total of matrix elements in the pixel and the dots of each color are arranged in the pixel so as not to cause an overlap therebetween in the pixel; and
   control means for controlling the output of the binary data for each color to the thermal printer.

2. The apparatus according to claim 1, wherein said multiplying factor is $\frac{1}{3}$.

3. The apparatus according to claim 1, wherein said signal generating transducer means includes a section for effecting a δ correction.

4. The apparatus according to claim 1, wherein said processing means includes a section of generating data for black from the density level common to each separated color.

5. The apparatus according to claim 1, wherein said signal generating transducer means includes a section for effecting a shading correction.

6. The apparatus according to claim 1, wherein said electric signal is a digital signal.

7. A method for generating a print for each color undergone a color separation from a color manuscript, comprising:
   achieving an optical scanning of the full color manuscript with a color separation;
   obtaining an electric signal corresponding to a density level at each pixel of an image of each separated color of three primary colors resulting from the color separation;
   determining a number of dots of each color by processing the electric signals by reducing the density level of each color at each pixel location by an amount corresponding to a density level common to each separated color and multiplying the electric signals by a factor of decimal fraction corresponding to the number of separated colors so that a total of dots of each color for a pixel is at most a total of matrix elements of the pixel in an area gradation method ;
   arranging the determined number of dots of each color in the matrix elements so as not to cause an overlap therebetween; and
   separately outputting an image data for each color to a thermal printer, thereby generating the print for each color.

8. The method according to claim 7, further including a step for generating from the electric signal of each color a signal representing black by use of the density level common to each other , the black signal generated in said signal generating step being used to arrange black together with said three colors in the matrix elements in said arranging step.

9. The method according to claim 7, wherein said determining step effects processing by multiplying the electric signal by $\frac{1}{3}$.

10. An apparatus for effecting an optical scanning of a full color manuscript, for separating an optical image thereof into three primary color images, for reading each image, and for outputting data for each image thus read to a thermal printer so as to generate a print associated with each primary color obtained by the color separation, comprising:
    means for effecting an optical scanning of the full color manuscript;
    means including a spectroscope for effecting a color separation of an optical image obtained by optically scanning the full color manuscript;
    a plurality of photoelectric transducer means for conducting a photoelectric conversion for each color of light to generate an electric signal corresponding to a density level of the image associated with each separated color;
    means for processing each electric signal to generate binary data for the image to be outputted to a thermal printer, said means adapted to process the electric signals according to an area gradation method that includes multiplying the electric signals by a factor of less than one so that a total of dots in a pixel associated with each color is at most a total of matrix elements in the pixel and the dots of each color are arranged in the pixel so as not to cause an overlap therebetween in the pixel; and control means for controlling the output of the binary data for each color to the thermal printer;

wherein said processing means assigns priority to each dot of the pixel for distributing positions of the dots of each color with a predetermined order of colors for each dot thus assigned with priority.

11. The apparatus according to claim 10, wherein said processing means executes a processing to multiply the electric signals by $\frac{1}{2}$.

12. The apparatus according to claim 10, wherein said processing means includes a section for generating data for black through a UCR processing.

13. The apparatus according to claim 10, wherein said processing means includes a section for effecting a shading correction.

14. The apparatus according to claim 10, wherein said signal generating transducer means includes a section for effecting a δ correction.

15. A method for generating a print for each color undergone a color separation from a color manuscript, comprising:

achieving an optical scanning of the full color manuscript with a color separation;

obtaining an electric signal corresponding to a density of an image of each separated color of three primary colors resulting from the color separation;

determining a number of dots of each color by processing the electric signals using an area gradation method that includes multiplying the electric signals by a factor of less than one, so that a total of dots of each color for a pixel is at most a total of matrix elements of the pixel, arranging the determined number of dots of each color in the matrix elements so as not to cause an overlap therebetween; and separately outputting an image data for each color to a thermal printer, thereby generating the print for each color, wherein said arranging step assigns priority to each dot of the pixel for distributing positions of the dots of each color with a predetermined order of colors for each dot thus assigned with priority.

16. The method according to claim 15, further including a step for generating from the electric signal of each color a signal representing black through a UCR processing, the black signal generated in said signal generating step being used to arrange black together with said three colors in the matrix elements in said arranging step.

17. The method according to claim 15, wherein said determining step effects processing by multiplying the electric signals by $\frac{1}{2}$.

18. An apparatus for effecting an optical scanning of a full color manuscript, for separating an optical image thereof into color images, for reading each image, and for outputting data for each image thus read to a thermal printer so as to generate a print associated with each color obtained by the color separation, comprising:

means for effecting an optical scanning of the full color manuscript;

means including a spectroscope for effecting a color separation of an optical image obtained by optically scanning the full color manuscript;

a plurality of photoelectric transducer means for conducting a photoelectric conversion for each color of light to generate an electric signal corresponding to a density level of the image associated with each separated color;

means for processing each electric signal to generate binary data for the image to be outputted to a thermal printer, said means adapted to process the electric signals according to an area gradation method that includes multiplying the electric signals by a factor of decimal fraction corresponding to the number of color images so that a total of dots in a pixel associated with each color is at most a total of matrix elements in the pixel and the dots of each color are arranged in the pixel so as not to cause an overlap therebetween in the pixel; and control means for controlling the output of the binary data for each color to the thermal printer;

wherein said processing means assigns priority to each dot of the pixel for distributing positions of the dots of each color with a predetermined order of colors for each dot thus assigned with priority.

19. The apparatus of claim 18, wherein three primary color images are used.

20. A method for generating a print for each color of a color manuscript having undergone a color separation, comprising the steps of:

achieving an optical scanning of the full color manuscript with a color separation;

obtaining electric signals corresponding to the density at each pixel location of each separated color resulting from the color separation;

determining a number of dots of each color by processing the electric signals using an area gradation method, including multiplying the electric signals by a factor of decimal fraction corresponding to the number of separated colors, so that a total of dots of each color for each pixel is at most a total of matrix elements of the pixel;

arranging the determined number of dots of each color in the matrix elements so as not to cause an overlap therebetween; and separately outputting an image data for each color to a thermal printer, thereby generating the print for each color, wherein said arranging step assigns priority to each dot of the pixel for distributing positions of the dots of each color with a predetermined order of colors for each dot thus assigned with priority.

21. The method of claim 20, wherein three primary colors are used.

22. An apparatus for effecting an optical scanning of a full color manuscript, for separating an optical image thereof into three primary color images, for reading each image, and for outputting data for each image to a thermal printer so as to generate a separate print of each complementary color associated with each primary color obtained by the color separation, comprising:

means for effecting an optical scanning of the full color manuscript;

means including a spectroscope for effecting a color separation of the optical image obtained by optically scanning the full color manuscript;

a plurality of photoelectric transducer means for conducting a photoelectric conversion for each primary color to generate a first electric signal corresponding to a density level at each pixel of the image associated with each separated color;

means for converting the first electric signal into a second electric signal representing a density level of each complementary color corresponding to each primary color;

means for processing each second signal to generate binary data for the image to be outputted to the thermal printer, said means adapted to process the second electric signals according to an area gradation method that includes reducing the second electric signal of each complementary color at each pixel location by an amount corresponding to a density level common to each complementary color and multiplying the second electric signal of each complementary color by a factor of decimal fraction corresponding to the number of color images used so that a total of dots in a pixel associated with each complementary color is at most a total of dots of matrix elements of the pixel and the dots of each complementary color are arranged in the pixel so as not to cause an overlap therebetween in the pixel; and control means for controlling the output of the binary data for each complementary color to the thermal printer.

23. The apparatus according to claim 22, wherein said multiplying factor is $\frac{1}{2}$.

24. The apparatus according to claim 22, further including means for generating a signal representing black from the second electric signal of each complementary color by use of the density level common to each complementary color, the black signal being used to arrange black together with said complementary colors in the matrix elements in said processing means.

25. A method for generating a separate print for each color from a full color manuscript, comprising the steps of:

achieving an optical scanning of the manuscript with a color separation;

obtaining a first electric signal corresponding to a density level at each pixel of an image of each separated color of three primary colors resulting from the color separation;

converting the first electric signal into a second electric signal representing a density level of each complementary color corresponding to each primary color;

determining a number of dots of each complementary color by reducing the second electric signals by an amount corresponding to a density level common to each complementary color and multiplying the second electric signal of each complementary color by a factor of decimal fraction corresponding to the number of color images so that a total of dots in a pixel associated with each complementary color is at most a total of dots of matrix elements of the pixel in an area gradation method;

arranging the determined number of dots of each complementary color in the matrix elements so as not to cause an overlap therebetween; and separately outputting an image data for each complementary color to a thermal printer, thereby generating the print for each complementary color.

26. The method of claim 25, wherein said multiplying factor is $\frac{1}{2}$.

27. The method of claim 25, further including a step of generating a signal representing black from the second electric signal of each complementary color by use of the density level common to each complementary color, the black signal in said signal generating step being used to arrange black together with the complementary colors in the matrix elements in said arranging step.

* * * * *